United States Patent [19]

Matuszak

[11] 4,244,118
[45] Jan. 13, 1981

[54] ALIGNMENT DEVICE FOR HAND HELD CUTTING TOOLS

[76] Inventor: Chester Matuszak, 6569 Ebinger Dr., Niles, Ill. 60648

[21] Appl. No.: 52,569

[22] Filed: Jun. 27, 1979

[51] Int. Cl.³ .................. B27B 9/04; B43L 7/00
[52] U.S. Cl. ........................... 33/430; 83/745
[58] Field of Search ............. 33/430, 443; 83/745, 83/455, 453, 454, 467, 574; 30/373; 269/1, 2

[56] References Cited

U.S. PATENT DOCUMENTS

| | | | |
|---|---|---|---|
| 2,548,197 | 4/1951 | Conner | 33/174 G |
| 3,830,130 | 8/1974 | Moore | 83/745 |
| 3,915,045 | 10/1975 | Kitzman | 33/443 |
| 4,059,038 | 11/1977 | Rietema | 83/745 |
| 4,075,920 | 2/1978 | Neal | 83/455 X |

FOREIGN PATENT DOCUMENTS 277348  11/1951  Switzerland ................ 33/430

Primary Examiner—Harry N. Haroian
Attorney, Agent, or Firm—Thomas R. Vigil

[57] ABSTRACT

The alignment device is utilized for guiding a hand manipulated power tool on the surface of a planar workpiece and includes an elongate guide member having a guide surface for guiding the shoe of the power tool and an elongate gauge member having an alignment edge adapted to be aligned on and with a desired line of cut on the surface of a workpiece. The elongate gauge member is releasably fixed to the guide member. The guide surface is parallel spaced to the alignment edge a predetermined distance equal to the distance from the shoe of the power tool to the path of travel of the cutting member of the power tool. The device also includes clamps for holding the alignment device to the workpiece and mating coupling members at each end of the device so that two or more devices can be coupled together to provide a composite longer alignment device.

10 Claims, 6 Drawing Figures

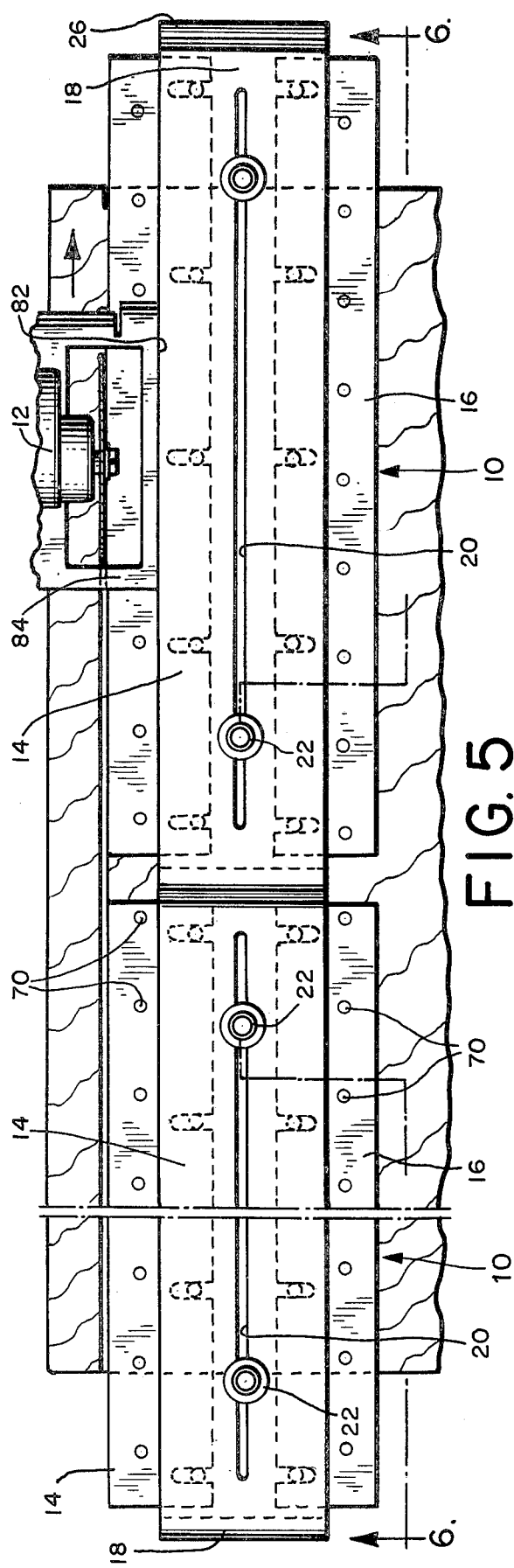
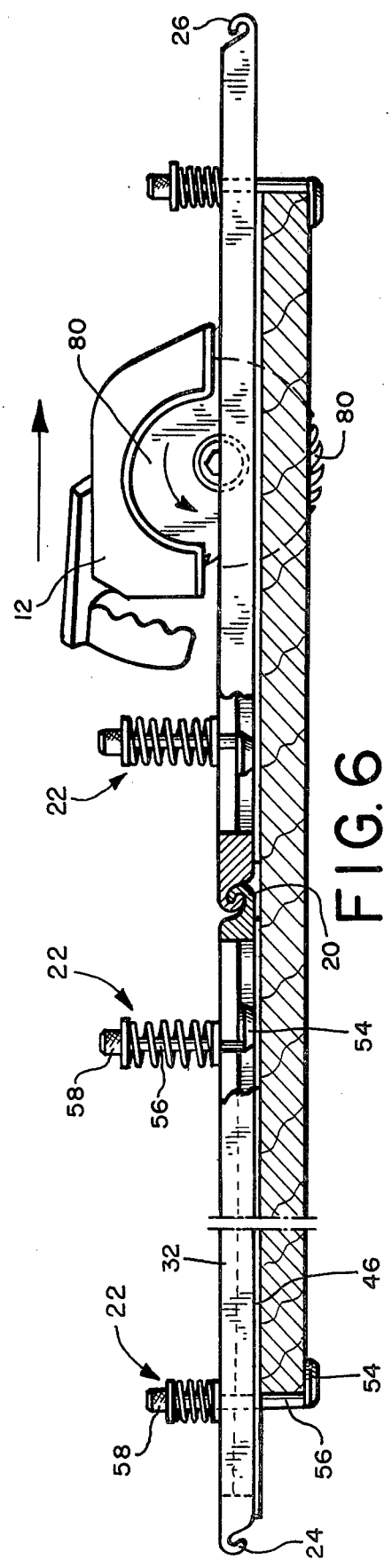

ALIGNMENT DEVICE FOR HAND HELD CUTTING TOOLS

BACKGROUND OF THE INVENTION

1. Field of the Invention

The present invention relates to an alignment device for guiding a hand manipulated power cutting tool and aligning the cutting edge of the power tool along a line of cut on a workpiece.

2. Description of the Prior Art

In the use of hand manipulated power tools for cutting planar workpieces such as boards, wall board and lumber, it has generally been necessary to provide a means for physically guiding the power tool to obtain a straight, clean cut along a predetermined, desired line of cut on the workpiece. Generally this has required marking the desired line of cut on the workpiece. After the workpiece is placed on a bench or table, a board or other straight edge which services as a guide means for the power tool is placed along a second predetermined line parallel to the desired line of cut and set back a distance equal to the distance between the cutting edge of the power tool and the guiding edge of the guide shoe on the power tool. When it is necessary to make a long cut on a large workpiece, multiple extensions of the line for the cutting edge are drawn on the workpiece and additional boards or other guiding means must be attached to the workbench or workpiece.

Heretofore various mechanisms have been proposed for guiding power driven cutting tools. Examples of such mechanisms are disclosed in the following U.S. Pat. Nos.

| U.S. Pat. No. | PATENTEE |
| --- | --- |
| 2,589,554 | Killian |
| 2,396,524 | Bridwell |
| 2,714,903 | Miller |
| 2,802,493 | Horneland |
| 2,860,014 | Short |
| 3,964,360 | Schwartz |
| 3,991,643 | Girardin |
| 4,031,794 | Leihgeber |
| 4,041,824 | Wynn |

The Schwartz U.S. Pat. No. 3,964,360 discloses a sheet material cutting apparatus which does not require the guide thereof to be clamped to a workbench or table. However, the guide and non-powered cutting tool travel in a slot located in the center of the apparatus and would not be adaptable to guide a hand held power tool. Further, this apparatus is utilized for cutting thin material and is designed for a knife edge rather than a power tool.

In the Wynn U.S. Pat. No. 4,041,824 there is disclosed a location apparatus which can be affixed to a workpiece without the necessity of having a workbench for providing a guide for a power tool. However, this apparatus is designed to hold the workpiece in a variety of positions and does not provide for a simple "lay on" of an alignment device on the workpiece as obtained with the alignment device of the present invention.

As will be described in greater detail hereinafter, the alignment device of the present invention differs from the devices disclosed in the patents identified above by providing for a simple "lay on" device which can be clamped directly to the workpiece thus avoiding the necessity for having a workbench or table, while simultaneously providing an alignment edge along the desired line of cut on the workpiece avoiding the necessity of making marks on the workpiece and for guiding the shoe of a power tool in parallel relationship to the alignment edge. Further, the alignment device of the present invention can be readily adjusted to fit a variety of hand manipulated powered cutting tools having different distances between a guide edge of the guide shoe thereof and the cutting edge of the power tool. Further, several of the alignment devices can be coupled together to form a single elongate guide surface and elongate alignment edge for the guiding of a hand manipulated power tool on long workpieces.

SUMMARY OF THE INVENTION

According to the invention there is provided an alignment device for guiding a hand manipulated power tool on a surface of a planar workpiece, said device comprising: a flat, planar, elongate gauge member adapted to be placed on a workpiece and having a gauge defining alignment edge which is adapted to be aligned on and with a desired line of cut on the surface of the workpiece, an elongate guide member adjustably fixable to and relative to said gauge member, having an elongate side guide surface and being positioned on said elongate gauge member with said guide surface spaced parallel to said alignment edge a predetermined distance equal to the distance from a shoe of a selected hand held power tool to the path of travel of a cutting member of the power tool, releasable attaching means for attaching said guide member on said gauge member and for permitting adjustment of the position of said gauge member relative to said guide member to adjust the distance between said alignment edge and said guide surface, and holding means for holding said device to the workpiece, said holding means for holding said device on a workpiece comprising clamping means for clamping said device to a workpiece, said guide member having an elongate channel therein, and said clamping means including at least one clamp member received in said channel and extending through said guide member.

BRIEF DESCRIPTION OF THE DRAWINGS

FIG. 5 is a top view of two alignment devices coupled together clamped to a workpiece.

FIG. 6 is taken along line 6—6 of FIG. 5 and is a vertical side view of the alignment device shown in FIG. 5.

DESCRIPTION OF THE PREFERRED EMBODIMENTS

Figure 1:
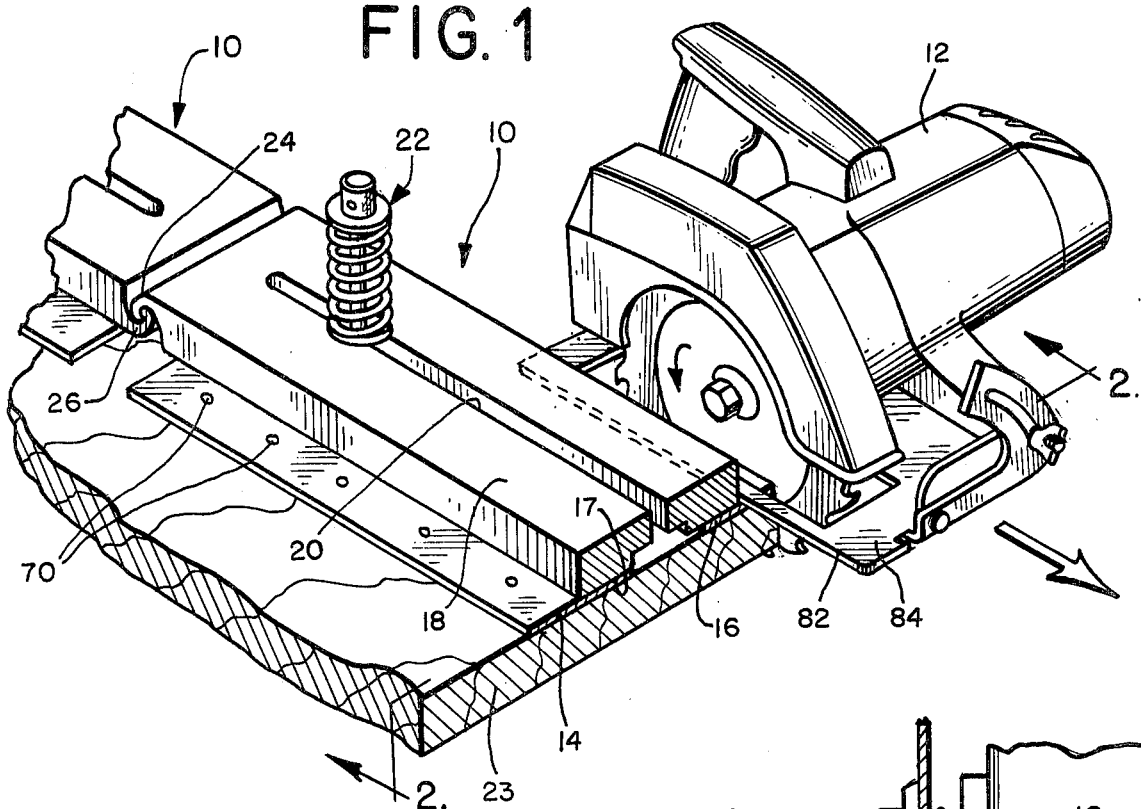
FIG. 1 is a perspective view of the alignment device of the present invention with a hand held cutting tool aligned thereon and with a second alignment device coupled thereto.

Referring now to the drawings in greater detail, there is illustrated in FIG. 1 an alignment device 10 for a hand held power tool 12. As shown, the alignment device 10 includes first and second elongate planar gauge members 14 and 16 which are secured to an underside 17 of an elongate guide member 18 having a rectangular cross-section. The guide member 18 has an elongate slot 20 therein for receiving at least two spring biased clamps 22 for clamping the alignment device 10 to a planar workpiece 23.

In FIG. 1 a second alignment device 10 is shown coupled to the first alignment device 10 by means of interlocking, curled hooked claw members 24 and 26, the member 26 on the second alignment device 10 being inverted from the member 24 on the first alignment device 10. The curled members 24 and 26 are coupled by sliding one into the other in a direction normal to the elongate axes of the alignment devices 10. It will be understood that each alignment device 10 has a downturned curled member 24 at one end and an upturned curled member 26 at the other end so that two or more alignment devices 10 of the same or different lengths can be coupled together to form a long composite alignment device for making a cut on a long workpiece or work surface.

Figure 2:
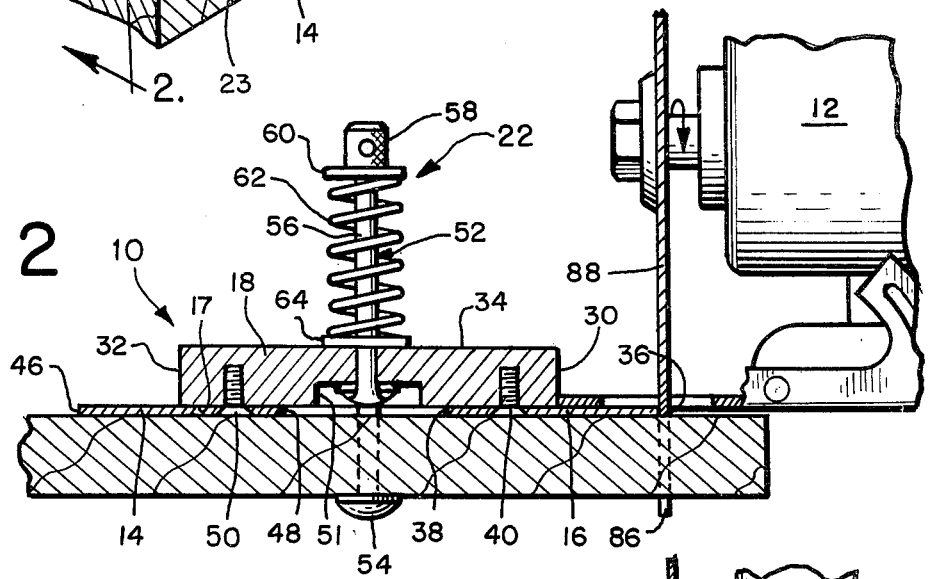
FIG. 2 is taken along line 2—2 of FIG. 1 and is an end view of the alignment device shown in FIG. 1.

As shown in FIG. 2, the guide member 18 of the alignment device 10 has first and second vertical guide surfaces 30 and 32 on either side thereof as well as an upper surface 34. Of course, it will be appreciated that the orientation of these various surfaces will be different if the alignment device 10 is "laid on" a vertical surface.

Figure 4:
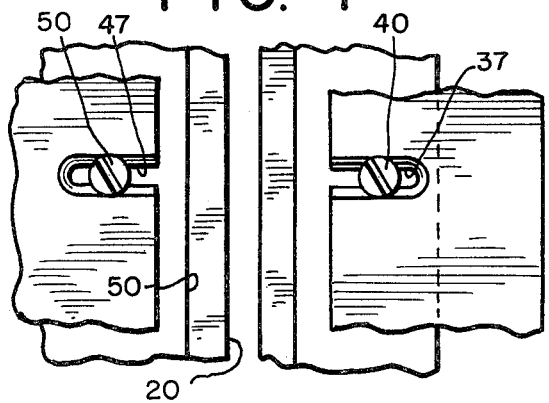
FIG. 4 is a fragmentary bottom view of the alignment device and shows mounting slots in the gauge members thereof.

The first gauge member 14 is a flat planar member made of a rigid but cutable material such as a piece of plywood. The first gauge member 14 has an outer elongate alignment edge 36 which is parallel spaced from and in alignment with the guide surface 30. The gauge member 14 has at least two and preferably five slots 37 therein which extend from an elongate edge 38 of the gauge member 14 inwardly toward the alignment edge 36 but not to the alignment edge 36 as best shown in FIGS. 4 and 5. Each of these slots receives a releasable fastener 40 which is fastened to the underside 17 of the guide member 18. In this way, the fasteners 40 can be loosened to adjust the position of the first gauge member 14.

Likewise, the second gauge member 16 is a flat planar member, has an outer elongate alignment edge 46, slots 47 and an inner elongate edge 48 which are similar to the edge 36, the slots 37 and the edge 38 in the first gauge member 14, and is secured by fasteners 50 to the guide member 18.

Figure 3:
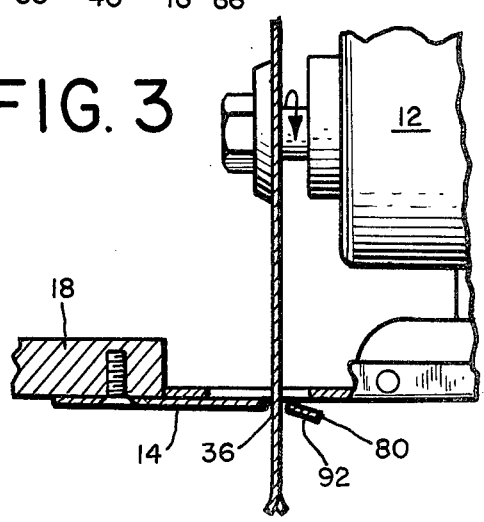
FIG. 3 is a fragmentary end view of the alignment device and shows a power tool trimming an edge of a gauge member of the device to form a specific alignment edge for that power tool.

As best shown in FIGS. 2 and 3, in the central area of the guide member 18 on the underside 17 thereof on either side of the elongate slot 20, an elongate recess 51 is provided. Also it will be apparent from FIGS. 2 and 4 that the inner edge 38, 48 of each of the first and second gauge members 14, 16 is spaced inwardly from the elongate slot 20 and the elongate recess 51.

As best shown in FIGS. 2 and 6, each of the spring biased clamps 22 includes an L shaped clamp member 52 having a wide clamp portion 54 which forms the bottom of the L and which extends parallel to the underside 17 of the guide member 18 and an upstanding shaft member 56 which extends through the elongate slot 20 to a knurled nut 58 at the upper end thereof. Positioned between the nut 58 and the upper surface 34 of the guide member 18 is a washer 60, spring 62, washer 64 assembly.

It will be apparent from FIGS. 2 and 6 that the clamp portion 54 is received within the elongate recess 51 and above the workpiece 23 when the clamp 22 is positioned over the workpiece 23 and that when the clamp 22 is positioned adjacent the edge of the workpiece 23 the knurled nut 58 is pushed down to compress the spring 62 and place the clamp portion 54 underneath the workpiece 23 as shown in FIG. 6.

In addition to the spring biased clamps 22 for securing the alignment device 10 to the workpiece 23, each gauge member 14 and 16 has a plurality of small holes 70 therein for receiving short nails therethrough for "tacking" one or both of the gauge members 14 and 16 to the workpiece 23. This is particularly important and necessary when a plurality of alignment devices 10 have been coupled together to provide a composite elongate alignment device and there are no means in the middle portion of the composite alignment device to clamp the same to the workpiece 23. When the alignment devices 10 are used in this manner, tacking is helpful to ensure that the alignment edges 36, 46 and guide surfaces 30, 32 of the alignment devices 10 are in proper alignment.

In the use of the alignment device 10, or of a plurality of devices 10 coupled together, one of the gauge members 14 or 16 such as the first gauge member 14 is fastened to the underside of the gauge member 18 with a non-specific orientation of an outer edge 80 thereof. However, such outer edge 80 will be at a distance greater than the distance from a side edge 82 of a guide shoe 84 of the power tool to a cutting edge 86 of a cutting element 88 which in the illustrated embodiment is a circular saw blade. The guide shoe 84 is placed on gauge member 14 with the side edge 82 thereof slidably abutting the guide surface 30. Then the power tool 12 is operated to trim off an outer margin 92 having the non-specifically oriented outer edge 80 of the gauge member 14 as best shown in FIG. 3. In this way, the specific alignment edge 36 for the power tool 12 is formed.

When the gauge member 14 has been so trimmed, the alignment device 10 now provides a guide surface 30 for the side edge 82 of the guide shoe 84 of the power tool 12 and an alignment edge 36 for the cutting element 88 of the power tool 12. Then the alignment device 10 can be easily "laid on" and releasably fixed to a workpiece with the alignment edge 36 aligned with a desired line of cut on the workpiece 23 and one can place the power tool with the side edge 82 of the guide shoe 84 slidably abutting the guide surface 30 and with the cutting element 88 arranged to cut exactly along the line of cut as best shown in FIG. 5.

Also it will be apparent that the slidably engagable upturned and downturned curled hooked claw members 24 and 26 forming a coupling between adjacently positioned alignment devices 10 also serve to align the guide surfaces 30, 32 and alignment edges 36, 46 of each of the alignment devices 10 to maintain a continuous, straight guide surface and a continuous, straight alignment edge in the composite alignment device so formed.

It is apparent that the gauge members 14 and 16 can be of a different width to permit a single alignment device to guide two different power tools.

It will be apparent from the foregoing description that the alignment device 10 of the present invention has a number of advantages, some of which have been described above and others of which are inherent in the invention. Also obvious modifications can be made to the alignment device 10 without departing from the teachings of the invention. In this respect, a different type of clamping means can be utilized in place of the spring biased clamps 22. Accordingly, the scope of the invention is only to be limited as necessitated by the accompanying claims.

I claim:

1. An alignment device for guiding a hand manipulated power tool on a surface of a planar workpiece, said device comprising: a flat, planar, elongate gauge member adapted to be placed on a workpiece and having a gauge defining alignment edge which is adapted to be aligned on and with a desired line of cut on the surface of the workpiece, an elongate guide member adjustably fixable to and relative to said gauge member, having an elongate side guide surface and being positioned on said elongate gauge member with said guide surface spaced parallel to said alignment edge a predetermined distance equal to the distance from a shoe of a selected hand held power tool to the path of travel of a cutting member of the power tool, releasable attaching means for attaching said guide member on said gauge member and for permitting adjustment of the position of said gauge member relative to said guide member to adjust the distance between said alignment edge and said guide surface, and holding means for holding said device to the workpiece, said holding means for holding said device on a workpiece comprising clamping means for clamping said device to a workpiece, said guide member having an elongate channel therein, and said clamping means including at least one clamp member received in said channel and extending through said guide member.

2. The device according to claim 1 wherein said alignment edge is formed for a specific power tool by attaching said guide member to said gauge member with a non-specific orientation relative to an elongate outer edge of said gauge member with said guide surface spaced a greater distance than said predetermined distance from said outer edge and then operating the specific power tool while moving the shoe thereof along said guide surface thereby trimming said outer edge of said gauge member with the cutting member to form said alignment edge.

3. The device according to claim 1 wherein at least one clamp member is spring biased.

4. The device according to claim 1 wherein said gauge member has holes therethrough for receiving means for tacking said device to said workpiece and wherein said holding means includes said tacking means.

5. The device according to claim 1 wherein said releasable attaching means comprises at least two fasteners and said gauge member has a second edge generally parallel to said alignment edge and at least two slots therein spaced apart from said alignment edge and extending inwardly from and normal to said second edge into and through said gauge member, said fasteners being received in said slots and releasably fastened to the underside of said guide member.

6. The device according to claim 1 wherein said guide member has a second side surface generally parallel to said first named guide surface and said gauge member has a second edge surface, said channel being situated intermediate said first and second guide surfaces and said second edge of said gauge member being aligned with or spaced from one elongate edge of said channel on the underside of said guide member.

7. The device according to claim 6 comprising a second gauge member mounted to said underside of said guide member on the opposite side of said channel, said second surface of said guide member forming a second guide surface for the shoe of the same or another power tool and said second gauge member having a second alignment edge specific for that tool.

8. The device according to claim 7 comprising coupling means on each end of said device for coupling the same to a second similar device, said guide surfaces and alignment edges of said second device being aligned with the guide surfaces and alignment edges of said first named device to provide continuous longer guide surfaces and continuous longer alignment edges for guiding one or two power tools on a longer workpiece.

9. The device according to claim 1 comprising coupling means on each end of said device for coupling the same to a second similar device, said guide surface and said alignment edge of said second device being aligned with the guide surface and alignment edge of said first named device to provide a continuous longer guide surface and a continuous longer alignment edge for guiding a power tool on a longer workpiece.

10. The device according to claim 9 wherein said coupling means includes a curled hooked claw member extending outwardly from one end of said first named device and adapted to interlock with a mating inverted curled hooked claw member extending outwardly from the other end of said second device.

* * * * *